(12) United States Patent
Lockhart et al.

(10) Patent No.: US 6,229,806 B1
(45) Date of Patent: May 8, 2001

(54) AUTHENTICATION IN A PACKET DATA SYSTEM

(75) Inventors: Thomas Wayne Lockhart, Vancouver (CA); Geoffrey Richard Scotton, Woodway, WA (US); Karl Anthony Reardon, Surrey (CA)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/000,645

(22) Filed: Dec. 30, 1997

(51) Int. Cl.$^7$ .................................................. H04L 12/28
(52) U.S. Cl. ........................ 370/389; 370/410; 370/355; 709/9; 709/7; 709/8; 713/186; 713/187; 713/188
(58) Field of Search ..................................... 370/256, 351, 370/401, 389, 355, 464, 410; 709/9, 2, 7, 8; 713/186, 187, 188

(56) References Cited

U.S. PATENT DOCUMENTS 6,108,583 * 8/2000 Schneck .................................. 709/9

* cited by examiner

Primary Examiner—Douglas Olms
Assistant Examiner—Ricardo M. Pizarro
(74) Attorney, Agent, or Firm—R. Louis Breeden

(57) ABSTRACT

A communication system in which a user device (10) generates authentication information (32) unique to the user device and provides a data packet (35) including this authentication information to an infrastructure part which is a gateway (14) or a host (16). The packet also contains a host identifier (36) or time dependent information (202). This is used at the gateway (14) or the host (16) to authenticate the packet.

32 Claims, 4 Drawing Sheets

AUTHENTICATION IN A PACKET DATA SYSTEM

FIELD OF THE INVENTION

This invention relates to communication systems in which data packets are communicated between a user device and an infrastructure part including a host. The invention relates to authentication of communications in such a system, and particularly relates to self-authenticating data packets.

BACKGROUND OF THE INVENTION

Most existing "for-fee" public communication networks, such as Motorola's DataTAC™ data radio systems or even cellular phone systems, include a "Home Location Register" commonly referred to as an HLR, which is a database of the network's subscribers. The network operator must create a record in this database for each subscriber. Subscribers are usually identified by a unique ID number. When a subscriber desires services from the network, he (actually his device) must register onto the network, supplying the ID number and possibly some additional authentication information, such as a password or historical information relating to the subscriber. This information is checked (i.e. authenticated) by the network against the subscriber's record in the HLR. All subsequent services are then billed to the identified subscriber. This mechanism works well for subscribers that use enough services for it to be worthwhile to bill them. For some applications however, such as residential alarm systems and others, this is not the case. The number of "subscribers" is very large and it is expensive to add them to the HLR database and also increases the database size slowing access for all subscribers.

Another authentication arrangement based on a register of identified subscribers can be found in U.S. Pat. No. 4,896,319 "Identification and Authentication of End User Systems for Packet Communications Network Services". Other public/private key approaches for authenticating IP packets, such as is described in U.S. Pat. No. 5,511,122 "Intermediate Network Authentication" require a database of the sender's public keys. This suffers from the same disadvantages as the HLR method described above.

Existing "free" communication systems (such as the Internet) often have no authentication mechanisms at all, because it is not necessary to bill anyone. Gaining access to the Internet via an "Internet Service Provider", or ISP, is very similar to the "for-fee" HLR mechanism described above. Each ISP has a database of their subscribers who usually use a password to authenticate their access to the ISPs services.

There is a need for an improved method of authentication in a data or radio data network, preferably one in which the infrastructure does not require an extensive list of all users seeking authentication.

Preferred embodiments of the present invention are now described, by way of example only, with reference to the drawings.

DETAILED DESCRIPTION OF THE DRAWINGS

Figure 1:
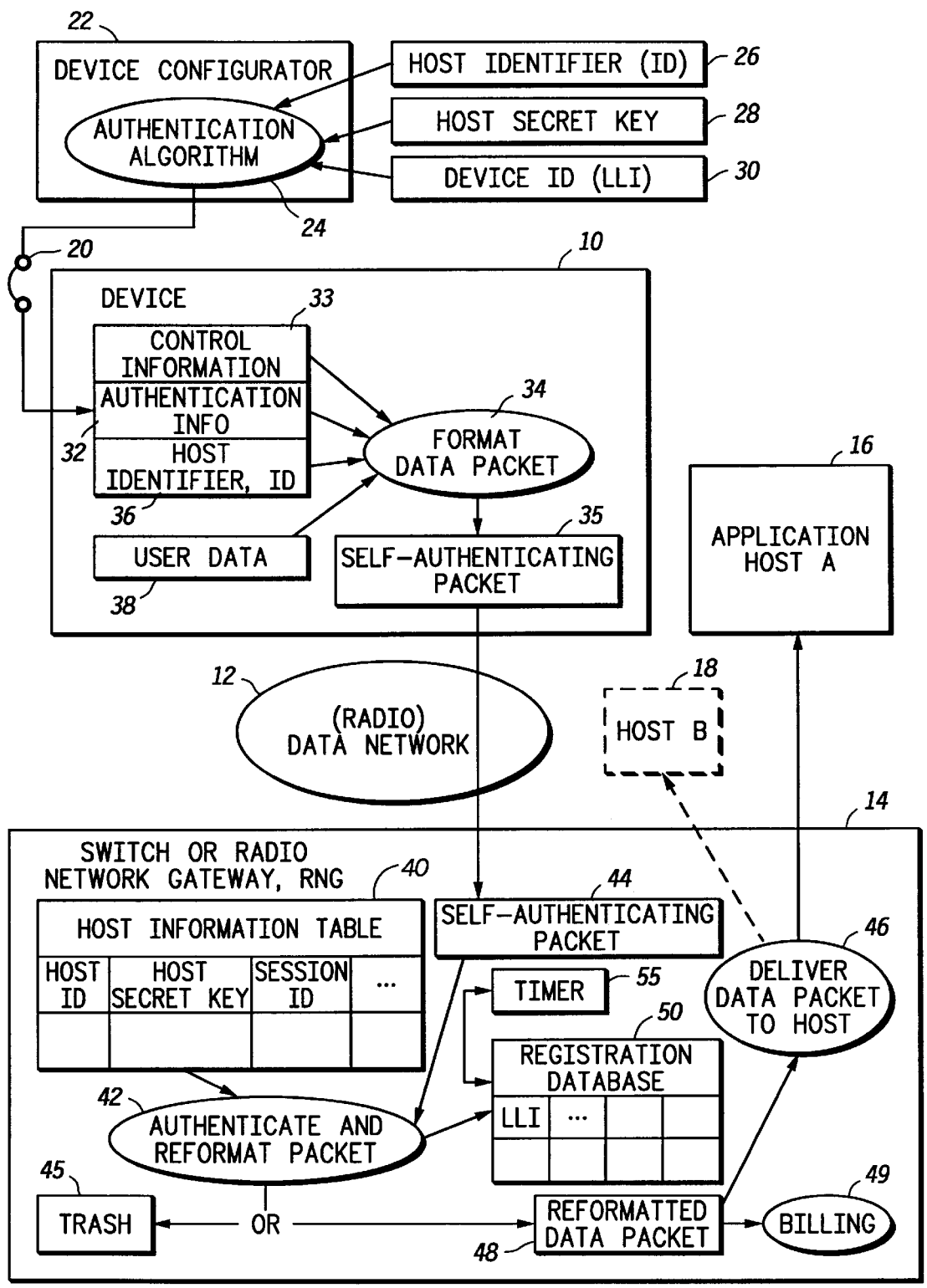
FIG. 1 shows a data network using self-authenticating data packets in accordance with the present invention.

Referring to FIG. 1, a data network is shown, which in the preferred embodiment is a radio data network such as a DataTAC™ data radio system. The system comprises an end user device 10, which may be mobile, but in the preferred embodiment is a fixed device, such as an alarm monitor or a water, gas or parking meter. The system comprises a radio data network 12, such as the ARDIS™ radio data network and it comprises a situation or radio network gateway (RNG) 14 connected to a host 16. The host 16 may, for example, be an alarm monitoring station, or a water or gas meter reading center or a parking meter reading center or other telemetry system host. One other host 18 is shown. There may be many hosts connected to the gateway 14. Connectable via a port 20 of the device 10 is a device configurator 22.

In greater detail, the device configurator 22 is a general propose computer or handheld dedicated configurator device having an authentication algorithm 24 and having stored in the device a host identifier 26 identifying the application host 16, a host secret key 28 known only to the operator of the host 16 and the radio network gateway 14 and securely programmed into the device configurator 22, and a device ID 30. The device ID 30 is preferably a link layer identifier which can be entered into the device configurator 22 and identifies the device 10.

The radio network gateway 14 comprises a host information table 40 which correlates host identifiers for the hosts 16, 18, etc. with host secret keys and (optionally) session IDs. The RNG also includes an authentication algorithm 42 which corresponds to the authentication algorithm 24 in a manner that is described in greater detail below. The RNG also comprises a self-authenticating packet receiver 44, a deliver routine, function or element 46, a data packet reformatter 48, billing software 49 (optional) and a registration database 50 (optional).

The operation of the system is as follows. On commissioning of the device 10, the device configurator 22 is connected to the device port and the device ID 30 is entered into the device configurator 22. From the host identifier 26, the host secret key 28 and the device ID 30, the authentication algorithm 24 generates authentication information 32. The exact nature of the authentication algorithm 24 is of no significance and many algorithms are available to those skilled in the art. An example is the DataTAC symmetric key algorithm (defined as part of the RD-LAP protocol suite), which is similar to RC4, the latter being an algorithm well-known in the industry. The algorithm 24 is such that the key 28 is substantially not recoverable from the authentication information 32 but that the authentication information 32 can only be generated from the host identifier 26 and the device ID 30 if the unique secret key 28 is available. (With sufficient processing power and available time with sufficient data the key 28 is recoverable from the authentication information 32, but for practical purposes it is not recoverable.)

In the device 10, a data packet formatter 34 (which is a format data packet process in a processor) formats a self-authenticating packet 35 using the authentication information 32, together with control information 33 (which preferably includes the device ID 30) and a host identifier 36 (which is identical to the host identifier 26). These information items are formatted together using the packet data formatter 34 with user data 38 into the self-authenticating packet 35. Such a self-authenticating packet is illustrated in FIG. 2.

Figure 2:
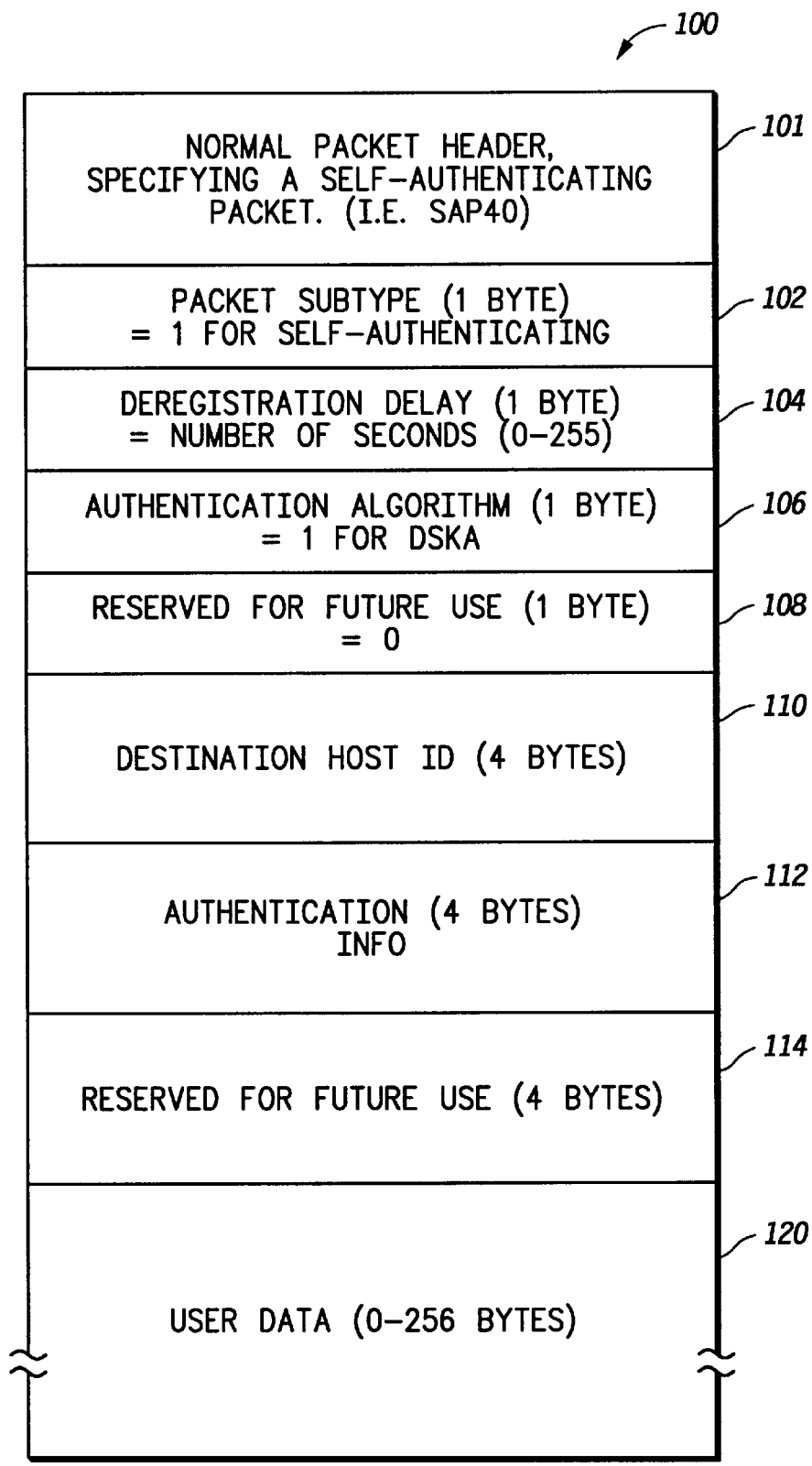
FIG. 2 illustrates a self-authenticating data packet as generated in the system of FIG. 1.

As shown in FIG. 2, a packet 100 comprises a packet header 101, which simply indicates that the packet is generated in accordance with a self-authenticating packet specification (but is not necessarily a self-authenticating packet). A packet sub-type 102 is provided, after the header 101, optionally indicating that the packet is in fact a self-authenticating packet. A deregistration delay 104 is inserted, capable setting a deregistration time of between 0 and 255 seconds. Following this is an identifier indicating the authentication algorithm to be used for authenticating the packet. Thus, there may be a number of different authentication algorithms. Authentication algorithm field 106 identifies which of a number of algorithms is to be used. The field is set to "one" for DataTAC symmetric key algorithm. Following the authentication algorithm field 106, there is an optional field 108 reserved for future use, and following this field is a destination host ID field 110. This contains the host identifier 36. Following the destination host ID field is an authentication information field 112 which contains the authentication information 32. Following this field is another field 114 reserved for future use and finally there is a user data payload 120, which contains the user data 38.

Referring again to FIG. 1, the self-authenticating packet 35 is transmitted over the radio data network 12 to the RNG 14 and is received at the self-authenticating packet receiver 44. After the RNG 14, the host identifier information 36 is extracted from the packet and is used to look up the correct host secret key 28 for the identified host in host information table 40. Optionally, a session ID is extracted from the table 40 if there is already a session in progress. If there is no session in progress, a session ID is allocated.

From the identified host secret key in the host information table 40 and from the host identifier 110 and the device ID part of the packet header 101, the authentication algorithm 42 is able to independently generate authentication information corresponding to the authentication information 32 contained in field 112 of the packet 100. The RNG is able to compare or correlate the independently generated authentication information with the received authentication information to authenticate the packet. In the simplest form, if there is a match, the packet is authenticated and if there is no match, the packet is discarded into a trash file 45. The authentication process 42 may be some process other than a simple comparison. If the packet is successfully authenticated, it is reformatted in reformatter 48 and delivered in delivery element 46 to the application host 16.

Figure 3:
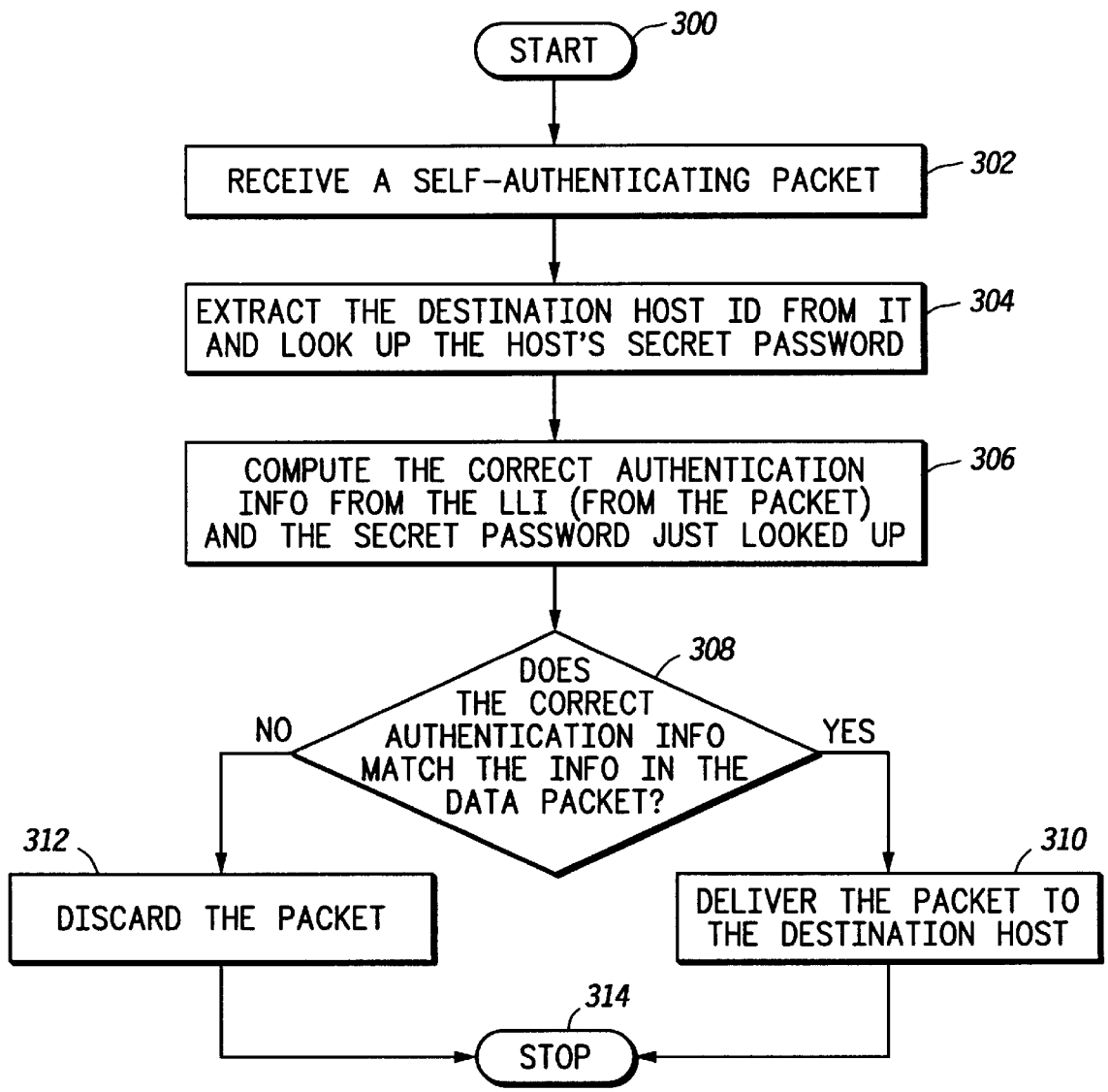
FIG. 3 illustrates operation of the authentication process in FIG. 1.

The process of authenticating the packet in algorithm 42 in RNG 14 is illustrated in greater detail in FIG. 3. The process starts upon reception of a self-authenticating packet at step 302. In step 304, the destination host ID is extracted from the packet and a look-up operation into host information table 40 is performed to look up the host's secret password. In step 306, the correct authentication information is computed from the link layer identifier (from the packet) and the secret password extracted from host information table 40. If, in step 308, the correct authentication information matches the authentication information in the data packet, the packet is delivered at step 310 to the destination host. Otherwise, the packet is discarded in step 312. After steps 310 and 312, the process is completed and stops at step 314.

Upon authentication of the packet and delivery of the packet to the host 16, a session is established between the device 10 and the host 16. In this manner, the authentication of the packet acts to establish automatic registration of the device 10 to the host 16. This feature of registration and sending of data within a single packet is a very useful innovation and improvement over prior arrangements. A single packet can perform the functions of registration and communication of data. The switch or gateway 14 is tied up for the minimum amount of time necessary for the performance of registration and communication of data. Moreover, a further advantageous feature is the provision of an automatic deregistration after a timeout. This feature is achieved by use of a timer 55 in the gateway 14 and, optionally, the deregistration delay 104 of the packet 100.

Upon authentication of the packet in algorithm 42, the registration database 50 is updated by allocation of a session identifier to the particular device identifier by its link layer identifier. This session identifier is used for all further communications between the device 10 and the host 16, either in the device-to-host direction or the host-to-device direction. The session identifier is valid for a limited period of time defined by the timer 55.

In this manner, the application host 16 can immediately reply to the incoming data packet. Typical replies from the host 16 include: (a) an acknowledgment; and (b) unsolicited update information for the device 10. Similarly, if the device 10 has further packet of data to send, either because the first self-authenticating packet had insufficient space in its payload 120 to provide all the data to the host, or because a message from the host generates a need for further messages from the device 10, these subsequent packets from the device 10 can be generated within the same session, using the same session identifier and without the need for each subsequent packet to include all the header information necessary for authentication and registration. This leads to greater efficiency. After a timeout defined by timer 55, the session ID is no longer valid and re-registration by the device 10 is necessary.

The timer can be set to 0. In such an instance, the session ends as soon as the first self-authenticating packet is delivered to the host. Preferably, however, the timer 55 defines a period sufficient for two or three packets to be transferred between the device 10 and the host 16 before re-registration is necessary. The device 10 has a similar timer to indicate when it is necessary to generate another self-authenticating packet to perform re-registration. Alternatively, the timer 55 can be reset to the deregistration delay 104 by each packet sent to or from the device 10. Again, both the device 10 and the RNG 14 must agree on the timeout method (via a protocol) and must use the same method.

Thus, there has been described a communication system comprising a user device 10 and an infrastructure part 14 and 16 which together include a host 16. The user device is arranged to generate authentication information 32 unique to the user device and provide a data packet 35 including the authentication information and a host identifier 36. The infrastructure part (which can be the gateway 14 or the host 16) is arranged to generate corresponding authentication information using at least the host identifier from the data packet and combining the authentication information from the user device with the corresponding authentication information to identify a correspondence there between and to thereby authenticate the packet.

Note that the authentication process can take place in the host 16. This would not be the most efficient arrangement in a system having many hosts but can be more efficient in a highly dedicated system having only one host or having only a small number of hosts.

An advantage of performing authentication in the gateway 14 is a matter of billing. The host 16 is billed for each successfully authenticated packet. Thus, in the preferred embodiment, billing software 49 in the RNG 14 generates a billing item for host 16 each time a packet for that host is authenticated and generates a billing item for host 18 each time a packet for that host is authenticated. This has the advantage that the host is not billed for packets that are delivered to the host erroneously or packets that are delivered to the host which are not capable of being authenticated.

If authentication takes place at the host 16, the gateway 14 delivers all packets having a host identifier 36 matching the identifier of the host 16 and in such an arrangement is most convenient to bill the host 16 for all packets delivered, regardless of whether they are later authenticated.

An arrangement has also been described in which the user device 10 has arranged to generate authentication information unique to the user device and to provide a data packet including the authentication information, wherein the infrastructure part (14 or 16) is arranged to generate corresponding authentication information and to combine the authentication information from the user device with the corresponding authentication information to identify a correspondence therebetween, and to thereby authenticate the packet and establish a time-limited session between the user device and the host device.

Figure 4:
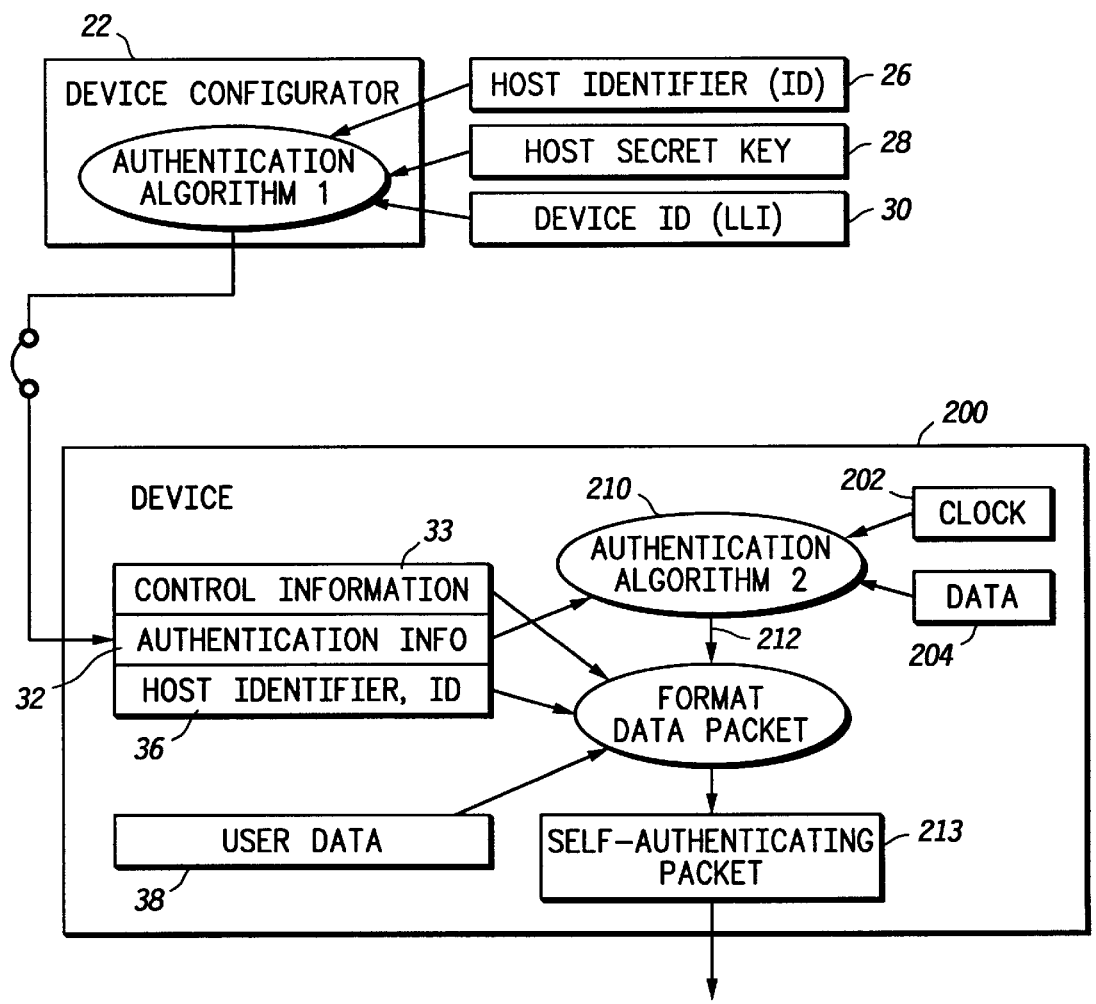
FIG. 4 illustrates an alternative arrangement for generating a self-authenticating packet in accordance with the invention.

A further embodiment of the invention is described with reference to FIG. 4, which shows a modified user device 200 coupled to the device configurator 22. The modified user device receives authentication information 32, as before, and includes control information 33 and host identifier 36, as before. The modified user device 200 additionally has a real time clock 202 and a date generator 204. These elements feed into a second authentication algorithm 210. The second authentication algorithm 210 generates second authentication information at output 212 and this second authentication information is formatted into a data packet together with user data 38. A self-authenticating packet is generated in packet generator 213 for sending over the network as before. The radio network gateway has a similar real time clock and date generator and a similar second authentication algorithm for replicating the generation of the information.

The operation of this embodiment is as follows. In generating th self-authenticating packet, the second authentication algorithm 210 takes into account the current actual time and date. The time and date are not recoverable from the resultant authentication information 212, but the resultant authentication information 212 is not able to be generated without these elements. Thus, the resultant self-authenticating packet is valid for only a particular time and date. The validity preferably extends over a period of time, where the period is sufficiently long in duration to encompass expected delays in the system. Thus, when the packet is received at the radio network gateway 14, it is not invalid by virtue of lapse of time through mere propagation through the radio data network 12. All authentication information results for clock times in the allowed range are compared with the received authentication information.

An advantage of this arrangement is that it is not possible for a "hacker" to intercept a packet and generate identical packets at a later time capable of being authenticated. Thus, for example, in an alarm system, it is not possible for a hacker to intercept and store a packet, and at later time, generate that packet again and again thus triggering multiple alarms. In an alarm system, such a weakness would enable a hacker to generate false alarms and cause an owner to deactivate his alarm system on account of an apparent fault.

The added feature gives the security that if a packet is intercepted and reproduced, it can be authenticated for only a brief period of time. After this time, it is not possible to modify the packet to generate another self-authenticating packet without knowledge of the authentication information 32 (or the secret key).

Thus, a communication system has been described in which the user device 10 is arranged to generate authentication information unique to the user device and provide a data packet including the authentication information and time dependent information 202. The time dependent information can be generated locally at the device 10 from a real-time clock 202 or it can be generated relative to a synchronization message received from the RNG 14, or indeed it can consist solely of a time-varying synchronization message broadcast by the RNG 14 to all user devices (which could simply be a time stamp or a pseudorandom number). The infrastructure part (14 or 16) is arranged to generate corresponding authentication information and time dependent information and to combine the authentication information from the user device with the corresponding authentication information and with the time dependent information (e.g. by a simple match operation), to identify a correspondence therebetween and to thereby authenticate a packet.

As before, the packet may establish a time-limited session between the user device and host device.

It has been described that it is preferable that the device configurator 22 is disconnected from the device 200 after the authentication information 32 has been generated. This is not essential. The host secret key can be programmed into the device 200 itself (preferably in some manner whereby it is not easily readable). The feature of the time dependent information 202 adds a degree of security to such an arrangement, making it more difficult to derive the host secret key from information generated by the second authentication algorithm. If the host secret key is included in the device 200, the first and second authentication algorithms can be combined into one algorithm into which is fed the host identifier 26, the host secret key 28, the device ID 30, the time from the real-time clock 202 and the date from the date generator 204.

Other modifications of detail can be made by one skilled in the art without departing from the spirit and scope of the invention.

What is claimed is:

1. A communications system comprising a user device and an infrastructure part including a host, the user device being arranged to;
generate authentication information unique to the user device, wherein the authentication information is derived from a key that is uniquely derived from a host identifier that identifies the host, and wherein the key is substantially not reversibly ascertainable from the authentication information;
generate a data packet including the authentication information and the host identifier; and
send the data packet to the infrastructure part; and the infrastructure part being arranged to;
generate corresponding authentication information, using at least the host identifier from the data packet; and
combine the authentication information from the user device with the corresponding authentication information to identify a correspondence therebetween and to thereby authenticate the data packet.

2. The communications system of claim 1, further comprising a gateway coupled to a radio network, for radio communication with the user device, wherein the host is coupled to the gateway and wherein the infrastructure part is the gateway.

3. The communications system of claim 2, wherein the gateway comprises billing software arranged to bill the host for each successfully authenticated data packet.

4. The communications system of claim 1, further comprising a gateway coupled to a radio network, for radio communication with the user device wherein the host is coupled to the gateway and wherein the infrastructure part is the host.

5. The communications system of claim 4, wherein the gateway is arranged to forward to the host all packets having a host identifier uniquely identifying the host, without prior authentication.

6. A communications system comprising a user device and an infrastructure part including a host,
the user device being arranged to:
generate authentication information unique to the user device, wherein the authentication information is derived from a key that is substantially not reversibly ascertainable from the authentication information;
generate a first data packet including the authentication information;
send the first data packet to the infrastructure part;
start a timer which sets a time-out; and
send at least a second data packet within the time-out time as part of a session that is common to the first and second data packets; and
the infrastructure part being arranged to:
generate corresponding authentication information; and
combine the authentication information from the user device with the corresponding authentication information to identify a correspondence therebetween and to thereby authenticate the data packet and establish a time-limit session between the user device and the host.

7. The communications system of claim 6, further comprising a gateway coupled to a radio network, for radio communication with the user device, wherein the host is coupled to the gateway and wherein the infrastructure part is the gateway.

8. The communications system of claim 7, wherein the gateway comprises billing software arranged to bill the host for each successfully authenticated data packet.

9. The communications system of claim 6, further comprising a gateway coupled to a radio network, for radio communication with the user device wherein the host is coupled to the gateway and wherein the infrastructure part is the host.

10. The communications system of claim 9, wherein the gateway is arranged to forward to the host all packets having a host identifier uniquely identifying the host, without prior authentication.

11. A communications system comprising a user device and an infrastructure part including a host,
the user device being arranged to:
generate authentication information unique to the user device, wherein the authentication information is derived from a key and time dependent information, and wherein the key and the time dependent information are substantially not reversibly ascertainable from the authentication information;
generate a data packet including the authentication information; and
send the data packet to the infrastructure part; and the infrastructure part being arranged to:
generate corresponding authentication information and time dependent information; and
combine the authentication information from the user device with the corresponding authentication information and time dependent information to identify a correspondence therebetween and to thereby authenticate the packet.

12. The communications system of claim 11, further comprising a gateway coupled to a radio network, for radio communication with the user device, wherein the host is coupled to the gateway and wherein the infrastructure part is the gateway.

13. The communications system of claim 12 wherein the time dependent information comprises a time-varying synchronization message broadcast from the gateway.

14. The communications system of claim 12, wherein the gateway comprises billing software arranged to bill the host for each successfully authenticated data packet.

15. The communications system of claim 11, further comprising a gateway coupled to a radio network, for radio communication with the user device wherein the host is coupled to the gateway and wherein the infrastructure part is the host.

16. The communications system of claim 15, wherein the gateway is arranged to forward to the host all packets having a host identifier uniquely identifying the host, without prior authentication.

17. A method of communicating in a communications system comprising a user device and an infrastructure part including a host, the method comprising:
generating, at the user device, authentication information unique to the user device, wherein the authentication information is derived from a key that is uniquely derived from a host identifier that identifies the host, and wherein the key is substantially not reversibly ascertainable from the authentication information;
generating a data packet including the authentication information and the host identifier;
sending the data packet to the infrastructure part;
generating, at the infrastructure part, corresponding authentication information, using at least the host identifier from the data packet; and
combining, at the infrastructure part, the authentication information from the user device with the corresponding authentication information to identify a correspondence therebetween and to thereby authenticate the data packet.

18. The method of claim 17, wherein authentication of the data packet causes a session to be established between the user device and the infrastructure part.

19. The method of claim 18, wherein a session identifier is entered into a database in the infrastructure part, identifying the session and correlating it with a device identifier uniquely identifying the user device.

20. The method of claim 19, wherein the session identifier is included in further packets within the session exchanged between the infrastructure part and the user device.

21. The method of claim 18, wherein the session ends after a set time-out.

22. A method of communicating in a communications system comprising a user device and an infrastructure part, the method comprising:
generating, at the user device, authentication information unique to the user device, wherein the authentication information is derived from a key that is substantially not reversibly ascertainable from the authentication information;

generating a first data packet including the authentication information;

sending the first data packet to the infrastructure part;

starting a timer which sets a time-out time;

sending at least a second data packet within the time-out time as part of a session that is common to the first and second data packets;

generating, at the infrastructure part, corresponding authentication information; and combining the authentication information from the user device with the corresponding authentication information to identify a correspondence therebetween and to thereby authenticate the packet and establish a time-limited session between the user device and the host device.

23. The method of claim 22, wherein the second data packet does not include authentication information.

24. The method of claim 22 further comprising restarting the timer on receipt of the second data packet within the time-out time.

25. The method of claim 22, wherein a session identifier is entered into a database in the infrastructure part, identifying the session and correlating it with a device identifier uniquely identifying the user device.

26. The method of claim 25, wherein the session identifier is included in further packets within the session exchanged between the infrastructure part and the user device.

27. A method of communicating in a communications system comprising a user device and an infrastructure part including a host, the method comprising:

generating, at the user device, authentication information unique to the user device, wherein the authentication information is derived from a key and time dependent information, and wherein the key and the time dependent information are substantially not reversibly ascertainable from the authentication information;

generating a data packet including the authentication information;

sending the data packet to the infrastructure part generating, at the infrastructure part, corresponding authentication information and time dependent information; and combining the authentication information from the user device with the corresponding authentication information and time dependent information to identify a correspondence therebetween and to thereby authenticate the data packet.

28. The method of claim 27, wherein authentication of the data packet causes a session to be established between the user device and the infrastructure part.

29. The method of claim 28, wherein a session identifier is entered into a database in the infrastructure part, identifying the session and correlating it with a device identifier uniquely identifying the user device.

30. The method of claim 29, wherein the session identifier is included in further packets within the session exchanged between the infrastructure part and the user device.

31. The method of claim 29, wherein the session ends after a set timeout.

32. The method of claim 27, wherein the time dependent information comprises a time-varying synchronization message broadcast from the infrastructure part to the user device.

\* \* \* \* \*